(12) United States Patent
Kim

(10) Patent No.: US 10,605,322 B2
(45) Date of Patent: Mar. 31, 2020

(54) HYDRAULIC MOUNT FOR VEHICLE

(71) Applicants: Hyundai Motor Company, Seoul (KR); Kia Motors Corporation, Seoul (KR)

(72) Inventor: Yong Joo Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/829,952

(22) Filed: Dec. 3, 2017

(65) Prior Publication Data
US 2019/0128364 A1    May 2, 2019

(30) Foreign Application Priority Data
Oct. 30, 2017   (KR) .................. 10-2017-0142209

(51) Int. Cl.
| | | |
|---|---|---|
| *F16F 13/10* | (2006.01) | |
| *F16H 57/025* | (2012.01) | |
| *B60K 5/12* | (2006.01) | |
| *F16H 57/028* | (2012.01) | |

(52) U.S. Cl.
CPC .......... *F16F 13/107* (2013.01); *B60K 5/1208* (2013.01); *F16F 13/101* (2013.01); *F16H 57/025* (2013.01); *F16H 57/028* (2013.01); *B60Y 2306/09* (2013.01)

(58) Field of Classification Search
CPC ..... F16F 13/107; F16F 13/101; F16H 57/025; F16H 57/028; B60K 5/1208; B60Y 2306/09

USPC ..... 267/140.13, 140.11, 141.1, 141.2, 141.3, 267/141.4, 141.5, 141.7; 248/636–638
See application file for complete search history.

(56) References Cited

U.S. PATENT DOCUMENTS

| | | | | |
|---|---|---|---|---|
| 4,726,573 A | * | 2/1988 | Hamaekers | ........... F16F 13/106 137/512.15 |
| 7,258,331 B2 | * | 8/2007 | Schneider | ............. F16F 13/105 267/140.13 |
| 7,419,144 B2 | * | 9/2008 | Hasegawa | ............. F16F 13/106 267/140.13 |
| 8,356,806 B2 | * | 1/2013 | Garety | .................. F16F 13/108 267/140.13 |
| 2006/0071381 A1 | * | 4/2006 | Hatakeyama | ......... F16F 13/106 267/140.13 |

(Continued)

*Primary Examiner* — Pamela Rodriguez
(74) *Attorney, Agent, or Firm* — Mintz Levin Cohn Ferris Glovsky and Popeo, P.C.; Peter F. Corless

(57) ABSTRACT

A hydraulic mount for a vehicle includes: a core bush coupled to a bolt; a main rubber formed on an outer surface of the core bush; an orifice portion coupled to a lower portion of the main rubber so as to divide an upper fluid chamber and a lower fluid chamber, the orifice portion including a lower plate and an upper plate; and a membrane mounted between the lower plate and the upper plate. A fluid path is formed on an upper surface portion of the lower plate, a lower inlet and outlet port is formed on a predetermined position of the fluid path, an upper inlet and outlet port communicating with the fluid path is formed on the upper plate, a concave groove portion and a fixing end are repeatedly and uniformly formed along a circumference of the upper plate so as to cover the fluid path on the lower plate and be coupled thereto, and the membrane is exposed through the concave groove portion.

6 Claims, 8 Drawing Sheets

(56) References Cited

U.S. PATENT DOCUMENTS

| | | | |
|---|---|---|---|
| 2006/0157902 A1* | 7/2006 | Sakata | B60K 5/1208 |
| | | | 267/140.13 |
| 2011/0221106 A1* | 9/2011 | Reinke | F16F 13/106 |
| | | | 267/140.13 |
| 2013/0264756 A1* | 10/2013 | Daito | F16F 13/08 |
| | | | 267/140.13 |

* cited by examiner

[FIG. 1]
PRIOR ART
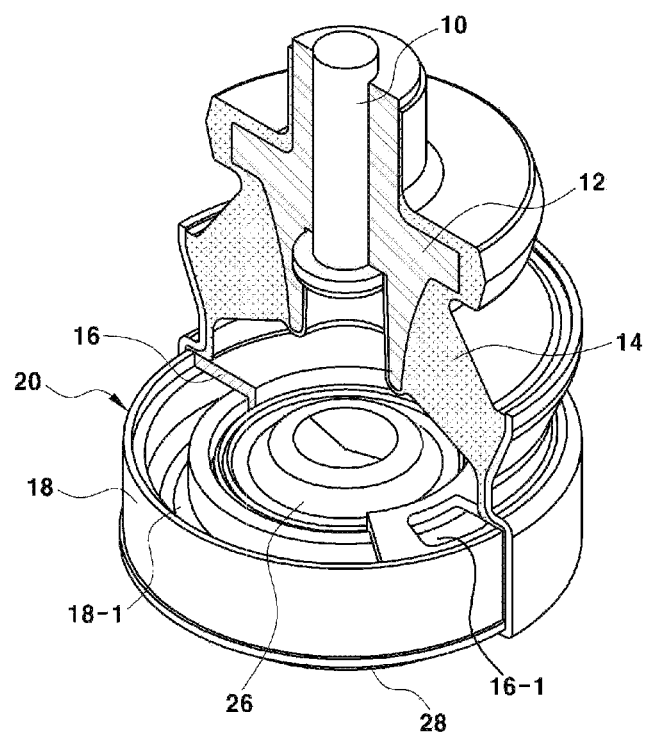

[FIG. 2]
PRIOR ART
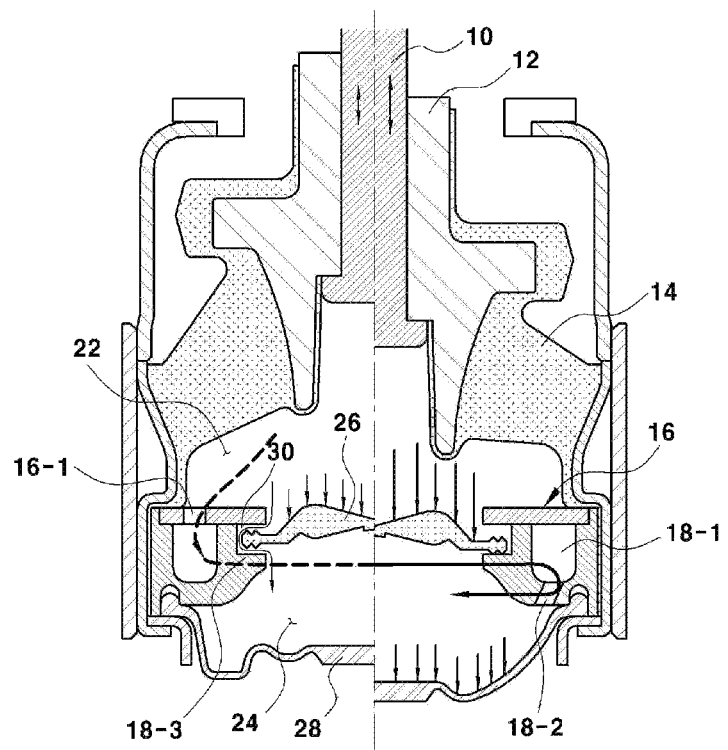

[FIG. 3]
PRIOR ART
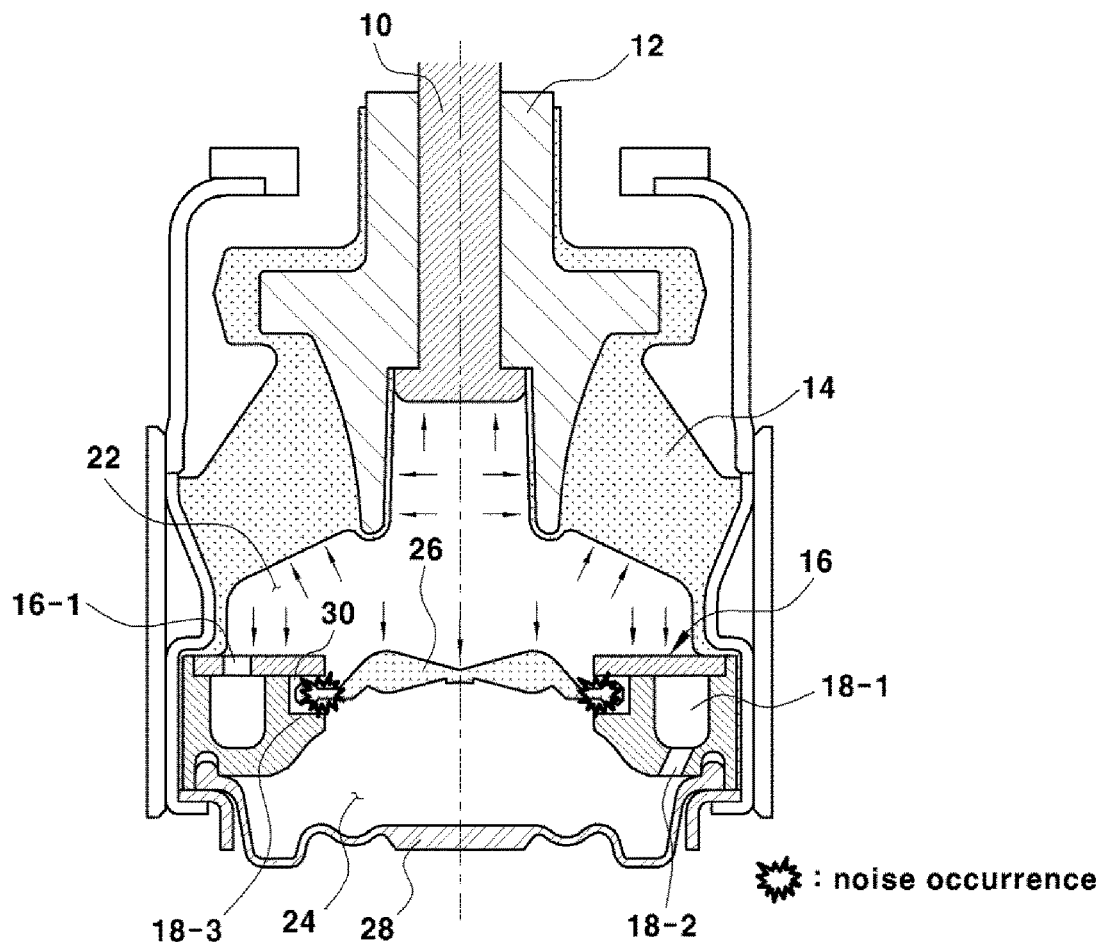
[FIG. 4]
PRIOR ART
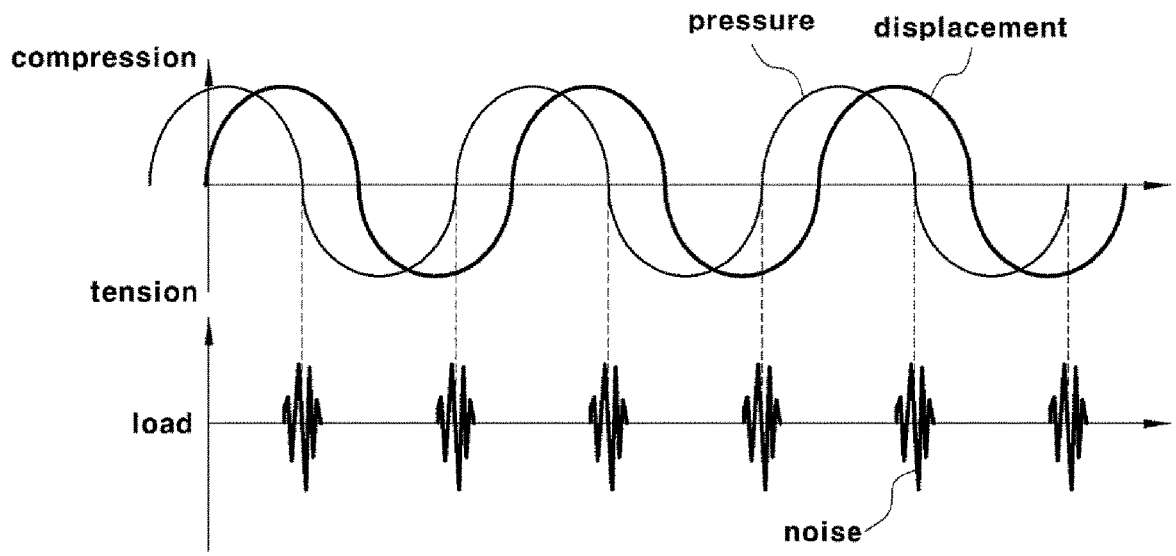

[FIG. 5]
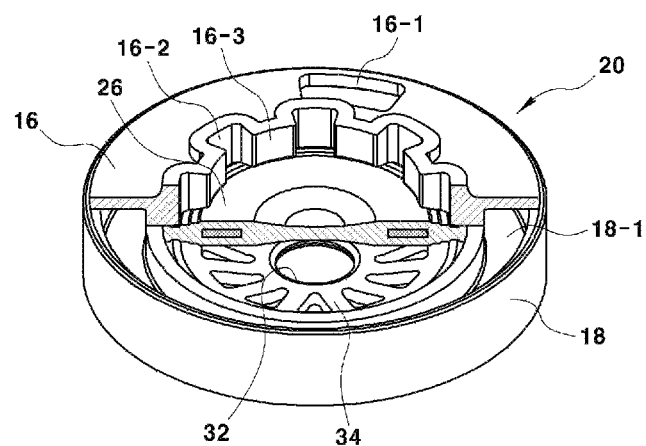
[FIG. 6]
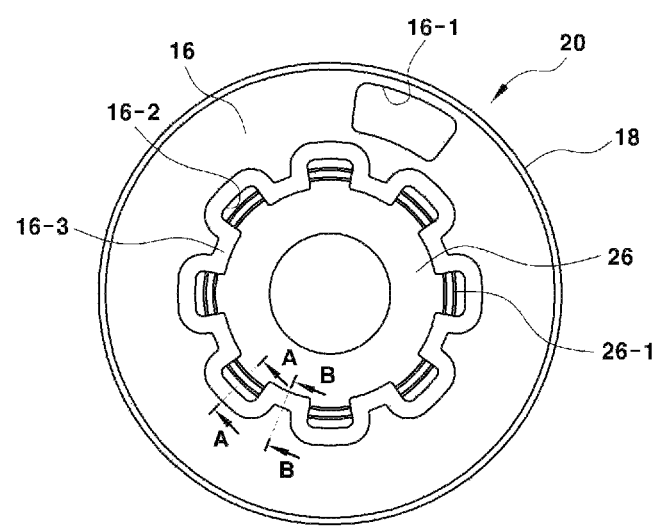

[FIG. 7]
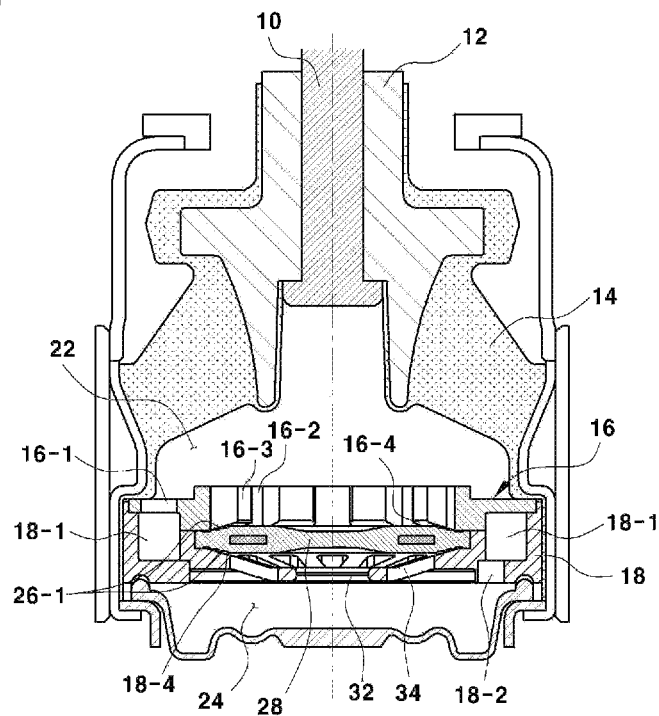
[FIG. 8]
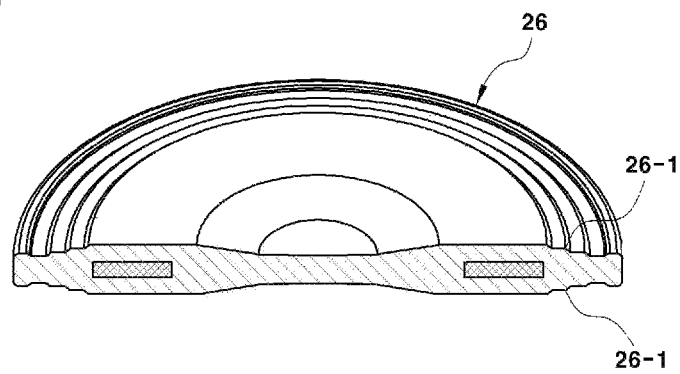

[FIG. 9]
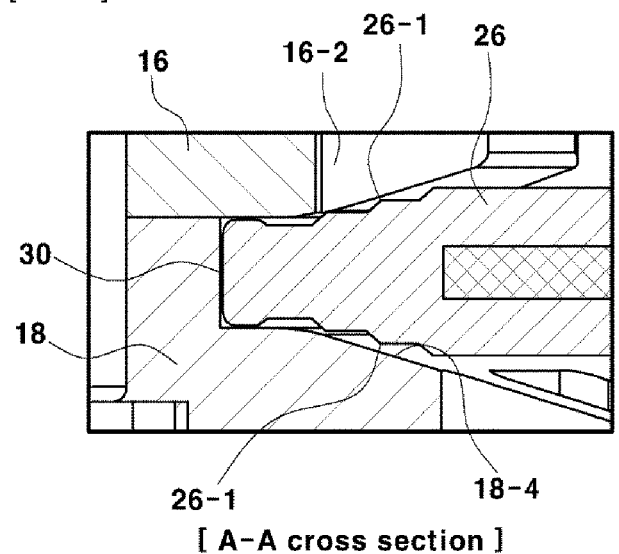
[ A-A cross section ]
[FIG. 10]
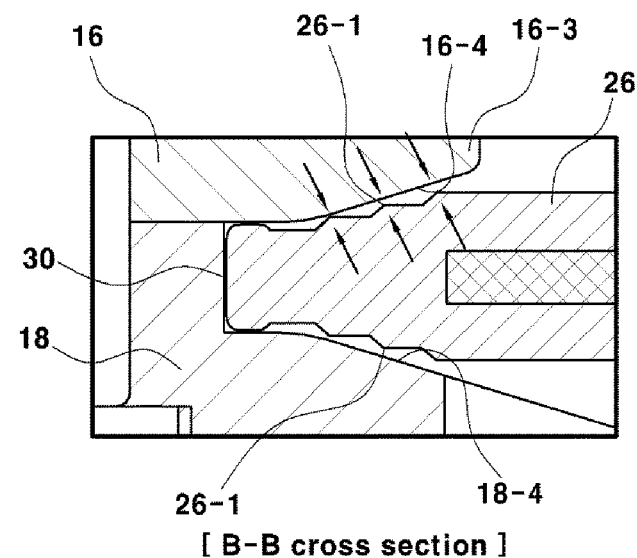
[ B-B cross section ]

[FIG. 11]
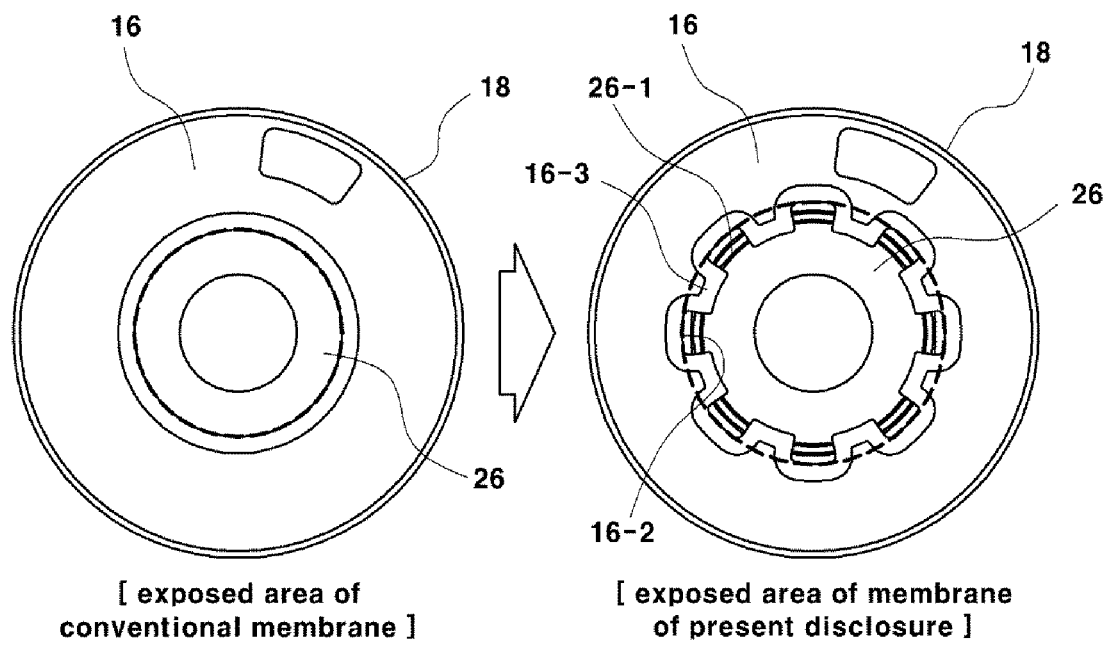
[ exposed area of conventional membrane ]
[ exposed area of membrane of present disclosure ]
[FIG. 12]
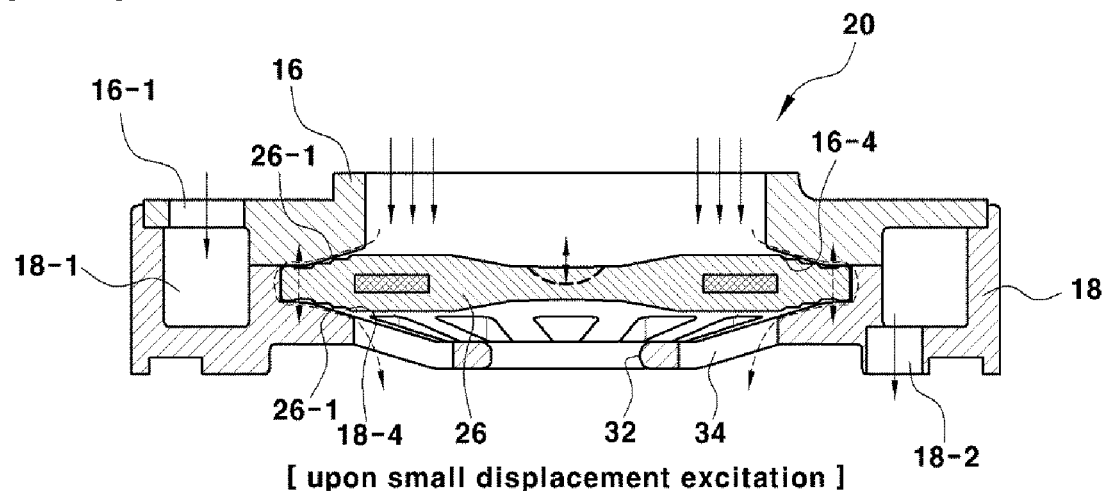
[ upon small displacement excitation ]

[FIG. 13]
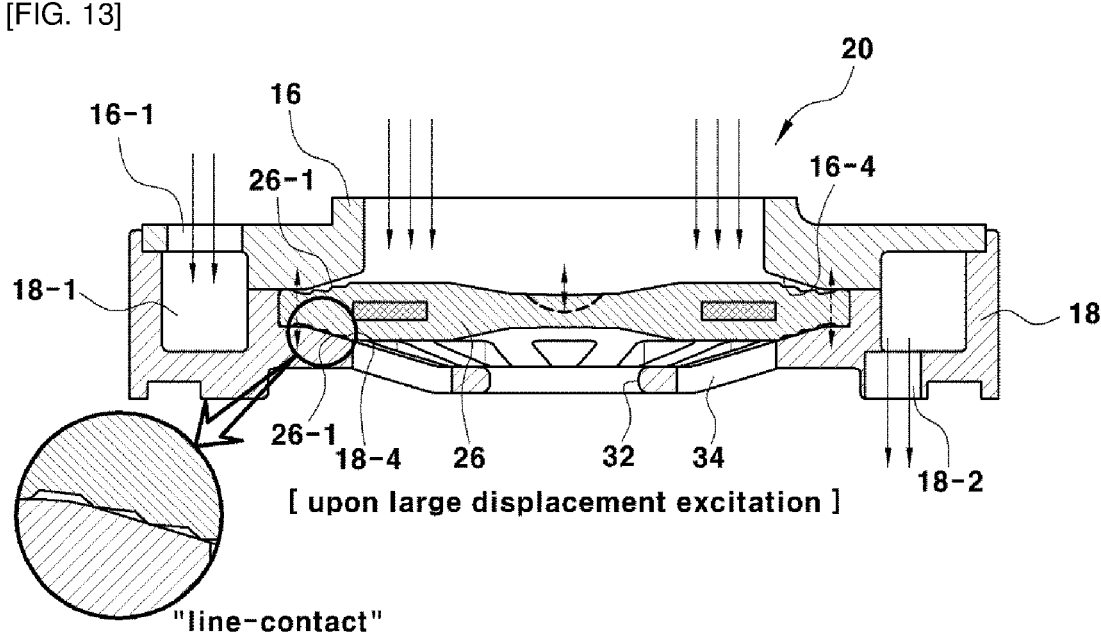
[ upon large displacement excitation ]
"line-contact"

HYDRAULIC MOUNT FOR VEHICLE

CROSS-REFERENCE TO RELATED APPLICATION

This application claims under 35 U.S.C. § 119(a) the benefit of priority to Korean Patent Application No. 10-2017-0142209 filed on Oct. 30, 2017, the entire contents of which are incorporated by reference as if fully set forth herein.

BACKGROUND

(a) Technical Field

The present disclosure relates to hydraulic mounts for vehicles and, more particularly, to a hydraulic mount for a vehicle capable of removing a rattle noise.

(b) Background Art

A vehicle power train generally includes an engine and a transmission. The power train can be mounted in an engine room of a vehicle, by an engine mount, a transmission mount, and the like, to reduce vibration and noise in the vehicle body. For instance, a fluid-sealed-type mount or hydraulic mount is widely used to seal fluid on a lower portion of an insulator (e.g., rubber), and may simultaneously reduce high-frequency range and low-frequency range vibrations.

Herein, a conventional hydraulic mount will be described with reference to the accompanying FIGS. 1 and 2 as follows.

As shown in FIGS. 1 and 2, a reference numeral 10 indicates a bolt coupled with an engine. The bolt 10 is coupled with a core bush 12; and an outer diameter portion of the core bush 12 is formed with a main rubber 14 by the method of a curing adhesion and the like.

Further, a lower portion of the main rubber 14 is positioned with an orifice portion 20 with an upper plate 16 and a lower plate 18 coupled to each other; and a lower portion of the orifice portion 20 is mounted with a lower rubber film 28 connected to a vehicle body using the bolt and the like as a medium.

In this case, the lower plate 18 is formed with a fluid path 18-1, which is a first orifice having a concave groove structure on an upper surface portion thereof, and is simultaneously produced as a ring shape with a lower inlet and outlet port formed on a predetermined position of the fluid path 18-1; and the upper plate 16 is produced by a ring-shaped plate body having an upper inlet and outlet port 16-1 to cover the fluid path 18-1 of the lower plate 18 and to be coupled thereto.

A central portion of the orifice portion 20 is mounted with a membrane 26 of a rubber material which divides an upper fluid chamber 22 and a lower fluid chamber 24. Specifically, the membrane 26 is positioned on a central opening portion of the orifice portion 20, is simultaneously received in a step portion 18-3 that an outer diameter portion of the membrane 26 is formed on an inner diameter portion of the lower plate 18, and then becomes the status covered by an inner circumferential end of the upper plate 16.

In this case, a nozzle portion 30, which is a second orifice allowing the fluid movement between the upper fluid chamber 22 and the lower fluid chamber 24, is formed between the outer diameter portion of the membrane 26 and the inner diameter portions of the upper plate 16 and the lower plate 18. Accordingly, when a large displacement vibration (e.g., driving on a bumpy road) is input to the hydraulic mount configured in the manner described above, as illustrated in the right side of the accompanying FIG. 2, the main rubber 14 is compressed and simultaneously, the nozzle portion 30 becomes a closing status by pressing the membrane 26; simultaneously, while the fluid within the upper fluid chamber 22 enters into the fluid path 18-1 of the lower plate 18 through the upper inlet and outlet port 16-1 formed on the upper plate 16 of the orifice portion 20, and then is filled into the lower fluid chamber 24 through the lower inlet and outlet port 18-2 formed on a predetermined position of the fluid path, the high reduction absorbing the large displacement vibration is implemented.

On the other hand, when a small displacement vibration (e.g., driving on a smooth road) is input to the hydraulic mount, as illustrated in the left side of the accompanying FIG. 2, the fluid of the upper fluid chamber 22 may absorb the small displacement vibration while moving toward the lower fluid chamber 24 side through the nozzle portion 30 to thereby obtain an improved effect of Noise, Vibration & Harshness (NVH).

However, as illustrated in the accompanying FIG. 3, when excitation occurs on the hydraulic mount, the membrane 26 is excited while an inner pressure of each fluid chamber varies, and a noise occurs due to hitting of the nozzle portion 30. Meanwhile, the membrane 26 repeatedly experiences tension and compression according to the excitation of the membrane.

That is, when the membrane 26 is excited, as illustrated in the graph of FIG. 4, there is a problem in that displacement occurs due to the repetition of compression and tension, and when the compression is converted into tension or when the tension is converted into compression, the membrane collides with the surface of the nozzle portion 30, thereby causing a disruptive rattle noise.

The above information disclosed in this Background section is only for enhancement of understanding of the background of the disclosure, and therefore it may contain information that does not form the related art.

SUMMARY OF THE DISCLOSURE

The present disclosure is proposed for solving the above problems. The object of the present disclosure is to provide a hydraulic mount for a vehicle capable of increasing an exposed area of the membrane which is exposed toward a upper fluid chamber. The disclosed hydraulic mount improves the contact between the membrane and the nozzle portion as a line-contact structure, thereby removing the disruptive rattle noise while maintaining a double orifice function and optimal reduction performance.

According to embodiments of the present disclosure, a hydraulic mount for a vehicle includes: a core bush coupled to a bolt; a main rubber formed on an outer surface of the core bush; an orifice portion coupled to a lower portion of the main rubber so as to divide an upper fluid chamber and a lower fluid chamber, the orifice portion including a lower plate and an upper plate; and a membrane mounted between the lower plate and the upper plate. A fluid path is formed on an upper surface portion of the lower plate, a lower inlet and outlet port is formed on a predetermined position of the fluid path, an upper inlet and outlet port communicating with the fluid path is formed on the upper plate, a concave groove portion and a fixing end are repeatedly and uniformly formed along a circumference of the upper plate so as to cover the fluid path on the lower plate and be coupled thereto, and the membrane is exposed through the concave groove portion.

Eight concave groove portions, in total, may be formed at a 45 interval along the circumference of the upper plate.

The membrane may be exposed toward a side of the upper fluid chamber through the concave groove portion.

An upper surface of an outer circumference of the membrane may be formed with a stepwise-type step portion for line-contact with a lower surface of the fixing end of the upper plate; and a lower surface of the outer circumference of the membrane may also be formed with a stepwise-type step portion for line-contact with the lower plate.

The lower surface of the fixing end of the upper plate may be formed as an inclined surface for the line-contact with the membrane.

An inner circumference of the lower plate may be formed as an inclined surface for line-contact with the membrane.

An inner circumference of the lower plate may be formed integrally with a membrane stopper in which a fluid-through hole is formed.

Accordingly, the present disclosure provides at least the following effects.

Firstly, it is possible to form the concave groove portion on the inner diameter portion of the upper plate to increase an area of the membrane which is exposed toward an upper fluid chamber side. Thus, the operating area of the fluid which operates on the membrane is increased, thereby absorbing idle vibration of the vehicle and the like while the membrane displaces the excitation of the fluid.

Secondly, even though the exposed area of the membrane is increased, it is possible to easily fix the membrane using the fixing end which is formed between the concave groove portions of the upper plate.

Thirdly, even though the fluid pressure due to a large displacement vibration (e.g., due to driving the vehicle on a rough road) operates on the membrane, since the stepwise-type step portion of the membrane has line-contact with the upper plate and the lower plate, it is possible to minimize occurrence of rattle noise occurring upon surface contact.

Other aspects and embodiments of the disclosure are discussed infra.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not limitative of the present disclosure, and wherein:

FIGS. 1 and 2 are views illustrating a conventional hydraulic mount;

FIGS. 3 and 4 are views illustrating the problems of the conventional hydraulic mount;

FIG. 5 is a partial cross-sectional perspective view illustrating an orifice portion of a hydraulic mount according to embodiments of the present disclosure;

FIG. 6 is a plan view illustrating the orifice portion of the hydraulic mount according to embodiments of the present disclosure;

FIG. 7 is a cross-sectional view illustrating the hydraulic mount according to embodiments of the present disclosure;

FIG. 8 is a cross-sectional perspective view illustrating the membrane of the hydraulic mount according to embodiments of the present disclosure;

FIG. 9 is a cross-sectional view taken on line A-A of FIG. 6;

FIG. 10 is a cross-sectional view taken on line B-B of FIG. 6;

FIG. 11 is a comparison diagram illustrating that the exposed area of the membrane of the hydraulic mount according to embodiments of the present disclosure is increased compared to a conventional hydraulic mount;

FIG. 12 is a cross-sectional view illustrating an operating status upon excitation of the small displacement with respect to the membrane of the hydraulic mount according to hydraulic mount the present disclosure; and FIG. 13 is a cross-sectional view illustrating an operating status upon excitation of the large displacement with respect to the membrane of the hydraulic mount according to hydraulic mount the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, positions, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with certain embodiments, it will be understood that present description is not intended to limit the disclosure to those embodiments. On the contrary, the disclosure is intended to cover not only the disclosed embodiments, but also various alternatives, modifications, equivalents and other embodiments, which may be included within the spirit and scope of the disclosure as defined by the appended claims.

Throughout the description, it will be understood that when a component is referred to as being "comprising" any component, it does not exclude other components, but can further comprises the other components unless otherwise specified. As used herein, the singular forms "a," "an," and "the" are intended to include the plural forms as well, unless the context clearly indicates otherwise. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, embodiments of the present disclosure will be described in detail with reference to the accompanying drawings.

As shown in FIG. 7, a hydraulic mount according to embodiments of the present disclosure is configured to include a core bush 12 coupled with a bolt 10; a main rubber 14 formed on an outer diameter surface of the core bush 12 by the method of a curing adhesion and the like; an orifice portion 20 coupled to a lower portion of the main rubber 14 to divide an upper fluid chamber 22 and a lower fluid chamber 24; and a lower rubber film 28 connected to a vehicle body using the bolt and the like as a medium. The bolt 10 is coupled with the core bush 12; and an outer diameter portion of the core bush 12 is formed with the main rubber 14 by a method of curing adhesion or the like.

Further, a lower portion of the main rubber 14 is positioned with an orifice portion 20 that the upper plate 16 and the lower plate 18 are coupled to each other; and a lower portion of the orifice portion 20 is mounted with the lower rubber film 28 connected to the vehicle body using the bolt and the like as a medium.

In this case, the lower plate 18 is formed with a fluid path 18-1 which is a first orifice having a concave groove structure on an upper surface portion thereof and simultaneously, is produced as a ring shape that a lower inlet and outlet port 18-2 is formed on a predetermined position of the fluid path 18-1; and the upper plate 16 is produced by a ring-shaped plate body having an upper inlet and outlet port 16-1 to cover the fluid path 18-1 of the lower plate 18 and to be coupled thereto.

Particularly, a central portion of the orifice portion 20 is mounted with a membrane 26 of a rubber material which substantially divides the upper fluid chamber 22 and the lower fluid chamber 24. That is, the membrane 26 is interposed between the upper plate 16 and the lower plate 18 to substantially divide the upper fluid chamber 22 and the lower fluid chamber 24.

In this case, a gap between an outer diameter portion of the membrane 26 and the inner diameter portions of the upper plate 16 and the lower plate 18, as illustrated in FIG. 10, is formed by a nozzle portion 30 which is a second orifice allowing the fluid movement between the upper fluid chamber 22 and the lower fluid chamber 24.

Particularly, according to the present disclosure, as illustrated in FIGS. 5 to 7, the upper plate 16 of the orifice portion 20 has a concave groove portion 16-2 and a fixing end 16-3 repeatedly and uniformly formed along the circumference on the inner diameter surface thereof.

In this case, the concave groove portion 16-2 for increasing an upper exposed area of the membrane 26 is concavely formed toward the outer diameter direction of the upper plate 16; and the fixing end 16-3 for fixing the membrane 26 performs the locking function available for contacting an edge upper surface of the membrane 26.

Accordingly, the upper exposed area of the membrane 26, that is, the area exposed toward the upper fluid chamber 22, as illustrated in the comparison diagram of the accompanying FIG. 11, becomes the status increased compared to the membrane included in the conventional fluid mount.

Preferably, eight concave groove portions 16-2, in total, are formed at a 45° interval along the circumference on the inner diameter surface of the upper plate 16. As a result, the upper exposed area of the membrane is increased and simultaneously, the locking area for the fixing end 16-3 is used to fix the membrane 26.

Meanwhile, as illustrated in FIG. 8, an upper surface of the outer circumference of the membrane 26 is formed with a stepwise-type step portion 26-1 for the line-contact with a lower surface of the fixing end 16-3 of the upper plate 16; and also the stepwise-type step portion 26-1 for the line-contact with the lower plate 18 is formed on a lower surface of the outer circumference of the membrane 26.

Accordingly the outer circumference of the membrane 26 has a thickness which gradually reduces toward the outer diameter direction by the stepwise-type step portion 26-1 formed on the upper and lower surfaces thereof.

Further, as illustrated in FIGS. 9 and 10, as the outer circumference of the membrane 26 has the gradually reducing thickness to be thereby formed as the stepwise-type step portion 26-1, the lower surface of the fixing end 16-3 of the upper plate 16 for the line-contact with the stepwise-type step portion 26-1 is formed as the inclined surface 16-4 and simultaneously, the inner circumference of the lower plate 18 is also formed as an incline.

Meanwhile, since the inner circumference of the lower plate 18 is integrally formed with a membrane stopper 34 that a fluid through-hole 32 is formed, the membrane stopper 34, in the case that the membrane 26 is moved in the downward by the fluid pressure, functions as preventing the membrane 26 from being escaped.

Herein, an operating flow on the hydraulic mount according to embodiments of the present disclosure having the configuration will be described as follows.

As shown in FIG. 12, when a small displacement vibration (e.g., due to an idle vibration or driving a vehicle on a smooth road) is input to the hydraulic mount, the fluid within the upper fluid chamber 22 operates on the membrane 26 and simultaneously, the membrane 26 performs the deformation moving in the downward to thereby absorb the small displacement vibration.

Of course, in the case that the vibration slightly larger than the small displacement vibration (is input to the hydraulic mount, the fluid within the upper fluid chamber 22 may absorb the vibration while moving to the lower fluid chamber 24 through the nozzle portion 30 between the output diameter portion of the membrane 26 and the inner diameter portions of the upper plate 16 and the lower plate 18, thereby obtaining a larger improved effect of Noise, Vibration & Harshness (NVH).

As shown in FIG. 13, in the case that a large displacement vibration (e.g., driving a vehicle on a rough road) is input to the hydraulic mount, the fluid within the upper fluid chamber 22 enters into and circulates in the fluid path 18-1 of the lower plate 18 through the upper inlet and outlet port 16-1 of the upper plate 16, and then the high reduction absorbing the large displacement vibration is implemented while passing through the lower inlet and outlet port 18-2 and being filled into the lower fluid chamber 24 through the lower inlet and outlet port 18-2 of the lower plate 18.

In this case, when the large displacement vibration is input to the hydraulic mount, the fluid within the upper fluid chamber 22 may excite the membrane 26 by a large pressure, thereby, conventionally, occurring the rattle noise due to the hitting while the outer circumference of the membrane 26 has the surface-contact (referring to FIG. 3) with the surface of the nozzle portion 30.

However, when the fluid within the upper fluid chamber 22 excites the membrane 26 by a large pressure, the angular edge portion of the stepwise-type step portion 26-1 formed on the upper and lower surfaces of the outer circumference of the membrane 26 has the line-contact with an inclined surface 16-4 of the upper plate 16 or an inclined surface of the lower plate 18; and in this case, the contact collision may be distributed and absorbed by the line-contact, thereby minimizing the rattle noise.

The disclosure has been described in detail with reference to certain embodiments thereof. However, it will be appreciated by those skilled in the art that changes may be made in these embodiments without departing from the principles and spirit of the disclosure, the scope of which is defined in the appended claims and their equivalents.

What is claimed is:

1. A hydraulic mount for a vehicle, comprising:
   a core bush coupled to a bolt;
   a main rubber formed on an outer surface of the core bush;
   an orifice portion coupled to a lower portion of the main rubber so as to divide an upper fluid chamber and a lower fluid chamber, the orifice portion including a lower plate and an upper plate; and
   a membrane mounted between the lower plate and the upper plate, wherein
   a fluid path is formed on an upper surface portion of the lower plate,
   a lower inlet and outlet port is formed on a predetermined position of the fluid path,
   an upper inlet and outlet port communicating with the fluid path is formed on the upper plate,
   a concave groove portion and a fixing end are repeatedly and uniformly formed on an inner circumferential surface along a circumference of the upper plate so as to cover the fluid path on the lower plate and be coupled thereto, and
   the membrane is completely exposed through the concave groove portion,
   wherein the upper plate has a ring-shaped plate body so that the membrane is completely exposed toward an upper fluid chamber side, and
   wherein the concave groove portion for increasing an upper exposed area of the membrane is concavely formed toward the outer diameter direction of the upper plate.

2. The hydraulic mount for the vehicle of claim 1, wherein eight concave groove portions, in total, are formed at a 45 degree interval along the circumference of the upper plate.

3. The hydraulic mount for the vehicle of claim 1,
   wherein an upper surface of an outer circumference of the membrane is formed with a stepwise-type step portion for line-contact with a lower surface of the fixing end of the upper plate; and a lower surface of the outer circumference of the membrane is also formed with a stepwise-type step portion for line-contact with the lower plate.

4. The hydraulic mount for the vehicle of claim 3,
   wherein the lower surface of the fixing end of the upper plate is formed as an inclined surface for the line-contact with the membrane.

5. The hydraulic mount for the vehicle of claim 3,
   wherein an inner circumference of the lower plate is formed as an inclined surface for line-contact with the membrane.

6. The hydraulic mount for the vehicle of claim 1,
   wherein an inner circumference of the lower plate is formed integrally with a membrane stopper in which a fluid-through hole is formed.

* * * * *